(12) United States Patent
Diard

(10) Patent No.: US 8,773,443 B2
(45) Date of Patent: Jul. 8, 2014

(54) COMPRESSION FOR CO-PROCESSING TECHNIQUES ON HETEROGENEOUS GRAPHICS PROCESSING UNITS

(75) Inventor: Franck Diard, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 662 days.

(21) Appl. No.: 12/649,329

(22) Filed: Dec. 30, 2009

(65) Prior Publication Data

US 2011/0063302 A1    Mar. 17, 2011

Related U.S. Application Data

(60) Provisional application No. 61/243,155, filed on Sep. 16, 2009, provisional application No. 61/243,164, filed on Sep. 17, 2009.

(51) Int. Cl.
| | |
|---|---|
| *G06F 15/00* | (2006.01) |
| *G09G 5/36* | (2006.01) |
| *G06T 11/40* | (2006.01) |
| *G09G 5/02* | (2006.01) |
| *G06T 1/00* | (2006.01) |

(52) U.S. Cl.
USPC ............ 345/501; 345/545; 345/552; 345/604

(58) Field of Classification Search
USPC .......................................... 345/604, 545–552
See application file for complete search history.

(56) References Cited

U.S. PATENT DOCUMENTS

| | | |
|---|---|---|
| 4,208,810 A | 6/1980 | Rohner et al. |
| 4,918,626 A | 4/1990 | Watkins et al. |
| 5,081,594 A | 1/1992 | Horsley |
| 5,212,633 A | 5/1993 | Franzmeier |
| 5,237,460 A | 8/1993 | Miller et al. |
| 5,287,438 A | 2/1994 | Kelleher |

(Continued)

FOREIGN PATENT DOCUMENTS

| | | |
|---|---|---|
| CN | 101093578 | 12/2007 |
| JP | 06180758 | 6/1994 |

(Continued)

OTHER PUBLICATIONS

A Hardware Assisted Design Rule Check Architecture Larry Seller Jan. 1982 Proceedings of the 19th Conference on Design Automation DAC '82 Publisher: IEEE Press.

(Continued)

*Primary Examiner* — Xiao Wu
*Assistant Examiner* — Matthew D Salvucci

(57) ABSTRACT

The graphics co-processing technique includes rendering a frame of red, green, blue (RGB) data on a graphics processing unit on an unattached adapter. The frame of RGB data are converted on the graphics processing unit on the unattached adapter to luminance-color difference (YUV) data. The YUV data is copied from frame buffers of the graphics processing unit on the unattached adapter to buffers in system memory. The YUV data is copied from the buffers in the system memory to texture buffers of a graphics processing unit on a primary adapter. A frame of RGB data is recovered from the YUV data in the texture buffer of the graphics processing unit on the primary adapter. The recovered frame of RGB data may then be presented by the graphics processing unit on the primary adapter on the primary display.

20 Claims, 9 Drawing Sheets

(56) References Cited

U.S. PATENT DOCUMENTS

| | | |
|---|---|---|
| 5,313,287 A | 5/1994 | Barton |
| 5,432,898 A | 7/1995 | Curb et al. |
| 5,446,836 A | 8/1995 | Lentz et al. |
| 5,452,104 A | 9/1995 | Lee |
| 5,452,412 A | 9/1995 | Johnson, Jr. et al. |
| 5,483,258 A | 1/1996 | Cornett et al. |
| 5,543,935 A | 8/1996 | Harrington |
| 5,570,463 A | 10/1996 | Dao |
| 5,594,854 A | 1/1997 | Baldwin et al. |
| 5,623,692 A | 4/1997 | Priem et al. |
| 5,633,297 A | 5/1997 | Valko et al. |
| 5,664,162 A | 9/1997 | Dye |
| 5,734,744 A | 3/1998 | Wittenstein et al. |
| 5,790,705 A | 8/1998 | Anderson et al. |
| 5,815,162 A | 9/1998 | Levine |
| 5,854,631 A | 12/1998 | Akeley et al. |
| 5,854,637 A | 12/1998 | Sturges |
| 5,872,902 A | 2/1999 | Kuchkuda et al. |
| 5,977,987 A | 11/1999 | Duluk, Jr. |
| 6,003,083 A | 12/1999 | Davies et al. |
| 6,026,180 A | 2/2000 | Wittenstein et al. |
| 6,028,608 A | 2/2000 | Jenkins |
| 6,034,699 A | 3/2000 | Wong et al. |
| 6,072,500 A | 6/2000 | Foran et al. |
| 6,104,407 A | 8/2000 | Aleksic et al. |
| 6,104,417 A | 8/2000 | Nielsen et al. |
| 6,115,049 A | 9/2000 | Winner et al. |
| 6,118,394 A | 9/2000 | Onaya |
| 6,128,000 A | 10/2000 | Jouppi et al. |
| 6,137,918 A | 10/2000 | Harrington et al. |
| 6,160,557 A | 12/2000 | Narayanaswami |
| 6,160,559 A | 12/2000 | Omtzigt |
| 6,181,822 B1 | 1/2001 | Miller et al. |
| 6,188,394 B1 | 2/2001 | Morein et al. |
| 6,201,545 B1 | 3/2001 | Wong et al. |
| 6,204,859 B1 | 3/2001 | Jouppi et al. |
| 6,219,070 B1 | 4/2001 | Baker et al. |
| 6,249,853 B1 | 6/2001 | Porterfield |
| 6,259,460 B1 | 7/2001 | Gossett et al. |
| 6,323,874 B1 | 11/2001 | Gossett |
| 6,356,588 B1 | 3/2002 | Otto |
| 6,359,623 B1 | 3/2002 | Larson |
| 6,362,819 B1 | 3/2002 | Dalal et al. |
| 6,366,289 B1 | 4/2002 | Johns |
| 6,429,877 B1 | 8/2002 | Stroyan |
| 6,437,780 B1 | 8/2002 | Baltaretu et al. |
| 6,452,595 B1 | 9/2002 | Montrym et al. |
| 6,469,707 B1 | 10/2002 | Voorhies |
| 6,480,205 B1 | 11/2002 | Greene et al. |
| 6,501,564 B1 | 12/2002 | Schramm et al. |
| 6,504,542 B1 | 1/2003 | Voorhies et al. |
| 6,522,329 B1 | 2/2003 | Ihara et al. |
| 6,523,102 B1 | 2/2003 | Dye et al. |
| 6,525,737 B1 | 2/2003 | Duluk, Jr. et al. |
| 6,529,207 B1 | 3/2003 | Landau et al. |
| 6,545,684 B1 | 4/2003 | Dragony et al. |
| 6,606,093 B1 | 8/2003 | Gossett et al. |
| 6,611,272 B1 | 8/2003 | Hussain et al. |
| 6,614,444 B1 | 9/2003 | Duluk, Jr. et al. |
| 6,614,448 B1 | 9/2003 | Garlick et al. |
| 6,624,823 B2 | 9/2003 | Deering |
| 6,633,197 B1 | 10/2003 | Sutardja |
| 6,633,297 B2 | 10/2003 | McCormack et al. |
| 6,646,639 B1 | 11/2003 | Greene et al. |
| 6,671,000 B1 | 12/2003 | Cloutier |
| 6,693,637 B2 | 2/2004 | Koneru et al. |
| 6,693,639 B2 | 2/2004 | Duluk, Jr. et al. |
| 6,697,063 B1 | 2/2004 | Zhu |
| 6,704,022 B1 | 3/2004 | Aleksic |
| 6,717,576 B1 | 4/2004 | Duluk, Jr. et al. |
| 6,717,578 B1 | 4/2004 | Deering |
| 6,734,861 B1 | 5/2004 | Van Dyke et al. |
| 6,741,247 B1 | 5/2004 | Fenney |
| 6,747,057 B2 | 6/2004 | Ruzafa et al. |
| 6,765,575 B1 | 7/2004 | Voorhies et al. |
| 6,778,177 B1 | 8/2004 | Furtner |
| 6,788,301 B2 | 9/2004 | Thrasher |
| 6,798,410 B1 | 9/2004 | Redshaw et al. |
| 6,803,916 B2 | 10/2004 | Ramani et al. |
| 6,819,332 B2 | 11/2004 | Baldwin |
| 6,833,835 B1 | 12/2004 | van Vugt |
| 6,901,497 B2 | 5/2005 | Tashiro et al. |
| 6,906,716 B2 | 6/2005 | Moreton et al. |
| 6,938,176 B1 | 8/2005 | Alben et al. |
| 6,940,514 B1 | 9/2005 | Wasserman et al. |
| 6,947,057 B2 | 9/2005 | Nelson et al. |
| 6,956,579 B1 | 10/2005 | Diard et al. |
| 6,961,057 B1 | 11/2005 | Van Dyke et al. |
| 6,978,317 B2 | 12/2005 | Anantha et al. |
| 7,002,591 B1 | 2/2006 | Leather et al. |
| 7,009,607 B2 | 3/2006 | Lindholm et al. |
| 7,009,615 B1 | 3/2006 | Kilgard et al. |
| 7,039,241 B1 | 5/2006 | Van Hook |
| 7,061,495 B1 | 6/2006 | Leather |
| 7,061,640 B1 | 6/2006 | Maeda |
| 7,064,771 B1 | 6/2006 | Jouppi et al. |
| 7,075,542 B1 | 7/2006 | Leather |
| 7,081,902 B1 | 7/2006 | Crow et al. |
| 7,119,809 B1 | 10/2006 | McCabe |
| 7,126,600 B1 | 10/2006 | Fowler et al. |
| 7,154,066 B2 | 12/2006 | Talwar et al. |
| 7,158,148 B2 | 1/2007 | Toji et al. |
| 7,167,259 B2 | 1/2007 | Varga |
| 7,170,515 B1 | 1/2007 | Zhu |
| 7,184,040 B1 | 2/2007 | Tzvetkov |
| 7,224,364 B1 | 5/2007 | Yue et al. |
| 7,243,191 B2 | 7/2007 | Ying et al. |
| 7,307,628 B1 | 12/2007 | Goodman et al. |
| 7,307,638 B2 | 12/2007 | Leather et al. |
| 7,308,146 B2 | 12/2007 | Becker et al. |
| 7,317,459 B2 * | 1/2008 | Fouladi et al. ............... 345/604 |
| 7,382,368 B1 | 6/2008 | Molnar et al. |
| 7,453,466 B2 | 11/2008 | Hux et al. |
| 7,478,187 B2 | 1/2009 | Knepper et al. |
| 7,483,029 B2 | 1/2009 | Crow et al. |
| 7,548,996 B2 | 6/2009 | Baker et al. |
| 7,551,174 B2 | 6/2009 | Iourcha et al. |
| 7,565,028 B2 | 7/2009 | Saed |
| 7,633,506 B1 | 12/2009 | Leather et al. |
| 7,634,637 B1 | 12/2009 | Lindholm et al. |
| 7,791,617 B2 | 9/2010 | Crow et al. |
| 7,965,902 B1 | 6/2011 | Zelinka et al. |
| 8,063,903 B2 | 11/2011 | Vignon et al. |
| 8,111,928 B2 | 2/2012 | Van Hook et al. |
| 8,411,942 B2 | 4/2013 | Chen et al. |
| 8,427,487 B1 | 4/2013 | Crow |
| 8,427,496 B1 | 4/2013 | Tamasi et al. |
| 2001/0005209 A1 | 6/2001 | Lindholm et al. |
| 2002/0050979 A1 | 5/2002 | Oberoi et al. |
| 2002/0061063 A1 | 5/2002 | Otto |
| 2002/0097241 A1 | 7/2002 | McCormack et al. |
| 2002/0130863 A1 | 9/2002 | Baldwin |
| 2002/0140655 A1 | 10/2002 | Liang et al. |
| 2002/0158885 A1 | 10/2002 | Brokenshire et al. |
| 2002/0196251 A1 | 12/2002 | Duluk, Jr. et al. |
| 2003/0067468 A1 | 4/2003 | Duluk, Jr. et al. |
| 2003/0076325 A1 | 4/2003 | Thrasher |
| 2003/0122815 A1 | 7/2003 | Deering |
| 2003/0163589 A1 | 8/2003 | Bunce et al. |
| 2003/0194116 A1 | 10/2003 | Wong et al. |
| 2003/0201994 A1 | 10/2003 | Taylor et al. |
| 2004/0085313 A1 | 5/2004 | Moreton et al. |
| 2004/0130552 A1 | 7/2004 | Duluk, Jr. et al. |
| 2004/0183801 A1 | 9/2004 | Deering |
| 2004/0196285 A1 | 10/2004 | Rice et al. |
| 2004/0207642 A1 | 10/2004 | Crisu et al. |
| 2004/0246251 A1 | 12/2004 | Fenney et al. |
| 2005/0030314 A1 | 2/2005 | Dawson |
| 2005/0041037 A1 | 2/2005 | Dawson |
| 2005/0066148 A1 | 3/2005 | Luick |
| 2005/0122338 A1 | 6/2005 | Hong et al. |
| 2005/0134588 A1 | 6/2005 | Aila et al. |
| 2005/0134603 A1 | 6/2005 | Iourcha et al. |
| 2005/0152610 A1 | 7/2005 | Hagiwara et al. |

(56) References Cited

U.S. PATENT DOCUMENTS

| | | |
|---|---|---|
| 2005/0179698 A1 | 8/2005 | Vijayakumar et al. |
| 2005/0259100 A1 | 11/2005 | Teruyama |
| 2006/0044317 A1 | 3/2006 | Bourd et al. |
| 2006/0170690 A1 | 8/2006 | Leather |
| 2006/0203005 A1 | 9/2006 | Hunter |
| 2006/0215923 A1 | 9/2006 | Beatty |
| 2006/0245001 A1 | 11/2006 | Lee et al. |
| 2006/0267981 A1 | 11/2006 | Naoi |
| 2006/0282604 A1* | 12/2006 | Temkine et al. ............... 710/314 |
| 2007/0008324 A1* | 1/2007 | Green ........................... 345/501 |
| 2007/0129990 A1* | 6/2007 | Tzruya et al. .................... 705/10 |
| 2007/0139440 A1 | 6/2007 | Crow et al. |
| 2007/0268298 A1 | 11/2007 | Alben et al. |
| 2007/0273689 A1 | 11/2007 | Tsao |
| 2007/0296725 A1 | 12/2007 | Steiner et al. |
| 2008/0024497 A1 | 1/2008 | Crow et al. |
| 2008/0024522 A1 | 1/2008 | Crow et al. |
| 2008/0034238 A1* | 2/2008 | Hendry et al. ................ 713/323 |
| 2008/0100618 A1 | 5/2008 | Woo et al. |
| 2008/0158233 A1* | 7/2008 | Shah et al. ..................... 345/501 |
| 2008/0273218 A1 | 11/2008 | Kitora et al. |
| 2009/0153540 A1* | 6/2009 | Blinzer et al. ................. 345/212 |
| 2009/0172707 A1 | 7/2009 | Huang et al. |
| 2010/0226441 A1* | 9/2010 | Tung et al. ............... 375/240.24 |
| 2011/0194616 A1 | 8/2011 | He et al. |

FOREIGN PATENT DOCUMENTS

| | | |
|---|---|---|
| JP | 10134198 | 5/1998 |
| JP | 11195132 | 7/1999 |
| JP | 2005182547 | 7/2005 |
| WO | 0013145 | 3/2000 |

OTHER PUBLICATIONS

A Parallel Alogorithm for Polygon Rasterization Juan Pineda Jun. 1988 ACM.

A VLSI Architecture for Updating Raster-Scan Displays Satish Gupta, Robert F. Sproull, Ivan E. Sutherland Aug. 1981 ACM SIGGRAPH Computer Graphics, Proceedings of the 8th Annual Conference on Computer Graphics and Interactive Techniques SIGGRAPH '81, vol. 15 Issue Publisher: ACM Press.

Blythe, OpenGL section 3.4.1, Basic Line Segment Rasterization, Mar. 29, 1997, pp. 1-3.

Boyer, et al.; "Discrete Analysis for Antialiased Lines;" Eurographics 2000; 3 Pages.

Crow; "The Use of Grayscale for Improves Raster Display of Vectors and Characters;" University of Texas, Austin, Texas; Work supported by the National Science Foundation unser Grants MCS 76-83889; pp. 1-5: ACM Press.

Foley, J. "Computer Graphics: Principles and Practice", 1987, Addison-Wesley Publishing, 2nd Edition, p. 545-546.

Fuchs; "Fast Spheres Shadow, Textures, Transparencies, and Image Enhancements in Pixel-Planes"; ACM; 1985; Department of Computer Science, University of North Carolina at Chapel Hill, Chapel Hill, NC 27514.

* cited by examiner

COMPRESSION FOR CO-PROCESSING TECHNIQUES ON HETEROGENEOUS GRAPHICS PROCESSING UNITS

CROSS-REFERENCE TO RELATED APPLICATIONS

This claims the benefit of U.S. Provisional Patent Application No. 61/243,155 filed Sep. 16, 2009 and U.S. Provisional Patent Application No. 61/243,164 filed Sep. 17, 2009.

BACKGROUND OF THE INVENTION

Conventional computing systems may include a discrete graphics processing unit (dGPU) or an integral graphics processing unit (iGPU). The discrete GPU and integral GPU are heterogeneous because of their different designs. The integrated GPU generally has relatively poor processing performance compared to the discrete GPU. However, the integrated GPU generally consumes less power compared to the discrete GPU.

The conventional operating system does not readily support co-processing using such heterogeneous GPUs. Referring to FIG. 1, a graphics processing technique according to the conventional art is shown. When an application 110 starts, it calls the user mode level runtime application programming interface (e.g., DirectX API d3d9.dll) 120 to determine what display adapters are available. In response, the runtime API 120 enumerates the adapters that are attached to the desktop (e.g., the primary display 180). A display adapter 165, 175, even recognized and initialized by the operating system, will not be enumerated in the adapter list by the runtime API 120 if it is not attached to the desktop. The runtime API 120 loads the device driver interface (DDI) (e.g., user mode driver (umd.dll)) 130 for the GPU 170 attached to the primary display 180. The runtime API 120 of the operating system will not load the DDI of the discrete GPU 175 because the discrete GPU 175 is not attached to the display adapter. The DDI 130 configures command buffers of the graphics processor 170 attached to the primary display 180. The DDI 130 will then call back to the runtime API 120 when the command buffers have been configured.

Thereafter, the application 110 makes graphics request to the user mode level runtime API (e.g., DirectX API d3d9.dll) 120 of the operating system. The runtime 120 sends graphics requests to the DDI 130 which configures command buffers. The DDI calls to the operating system kernel mode driver (e.g., DirectX driver dxgkrnl.sys) 150, through the runtime API 120, to schedule the graphics request. The operating system kernel mode driver then calls to the device specific kernel mode driver (e.g., kmd.sys) 150 to set the command register of the GPU 170 attached to the primary display 180 to execute the graphics requests from the command buffers. The device specific kernel mode driver 160 controls the GPU 170 (e.g., integral GPU) attached to the primary display 180.

Therefore, there is a need to enable co-processing on heterogeneous GPUs. For example, it may be desired to use a first GPU to perform graphics processing for a first class of applications and a second GPU for a second class of applications depending upon processing performance and power consumption parameters.

SUMMARY OF THE INVENTION

Embodiments of the present technology are directed toward graphics co-processing. The present technology may best be understood by referring to the following description and accompanying drawings that are used to illustrate embodiment of the present technology.

In one embodiment, a graphics co-processing method includes loading and initializing a device driver interface and a device specific kernel mode driver for a graphics processing unit on a primary adapter. A device driver interface and a device specific kernel mode driver for a graphics processing unit on an unattached adapter are also loaded without the device driver interface talking back to a runtime application programming interface. A frame of red, green, blue (RGB) data is rendered on the graphics processing unit on the unattached adapter. The frame of RGB data is converted to luminance-color difference (YUV) data on the graphics processing unit on the unattached adapter. The YUV data is copied from frame buffers of the graphics processing unit on the unattached adapter to buffers in system memory. The YUV data is copied from the buffers in the system memory to texture buffers of the graphics processing unit on the primary adapter. A frame of RGB data is recovered from the YUV data in the texture buffer of the graphics processing unit on the primary adapter. The recovered frame of RGB data may then be presented, by the graphics processing unit on the primary adapter, on the primary display.

In another embodiment, a graphics co-processing method includes loading a device specific kernel mode driver of a graphics processing unit tagged as a non-graphics device. A device driver interface and a device specific kernel mode driver are loaded and initialized for a graphics processing unit on a primary adapter. A device driver interface for the graphics processing unit on a non-graphics device tagged adapter is loaded and initialized without the device driver interface talking back to a runtime application programming interface. A frame of red, green, blue (RGB) data is rendered on the graphics processing unit on the non-graphics device tagged adapter. The frame of RGB data is converted to luminance-color difference (YUV) data on the graphics processing unit on the non-graphics device tagged adapter. The YUV data from frame buffers of the graphics processing unit on the non-graphics device tagged adapter is copied to buffers in system memory. The YUV data is copied from the buffers in the system memory to texture buffers of the graphics processing unit on the primary adapter. A frame of RGB data is recovered from the YUV data in the texture buffer of the graphics processing unit on the primary adapter. Thereafter, the recovered frame of RGB data may be presented, by the graphics processing unit on the primary adapter, on the primary display.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Embodiments of the present technology introduce a shim layer between the runtime API (e.g., DirectX) and the device driver interface (DDI) (e.g., user mode driver (UMD)) to separate the display commands from the rendering commands, allowing retargeting of rendering commands to an adapter other than the adapter the application is displaying on. In one implementation, the shim layer allows the DDI layer to redirect a runtime (e.g., Direct3D (D3D)) default adapter creation to an off-screen graphics processing unit (GPU), such as a discrete GPU, not attached to the desktop. The shim layer effectively layers the device driver interface, and therefore does not hook a system component.

Figure 1:
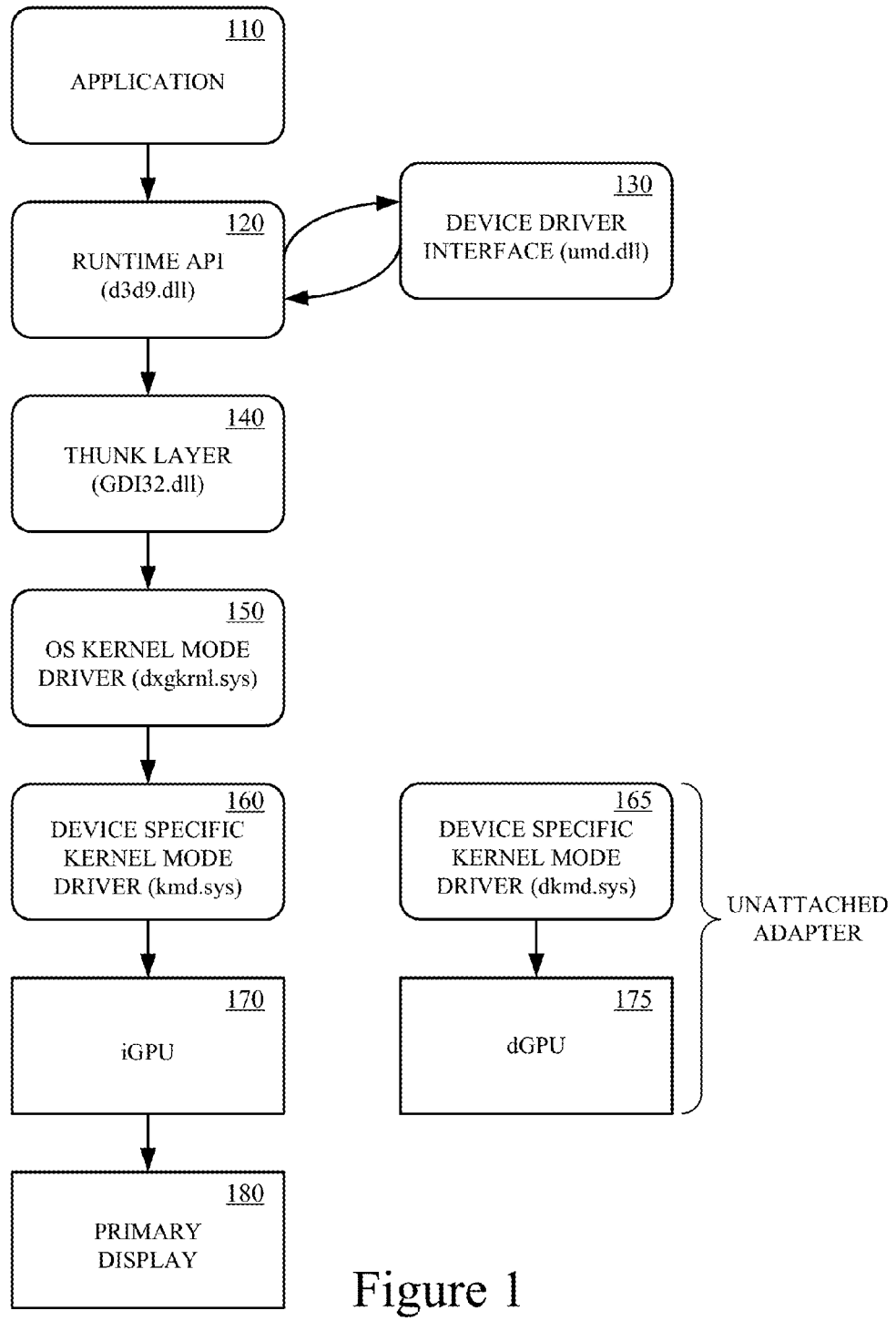
FIG. 1 shows a graphics processing technique according to the convention art.
Figure 2:
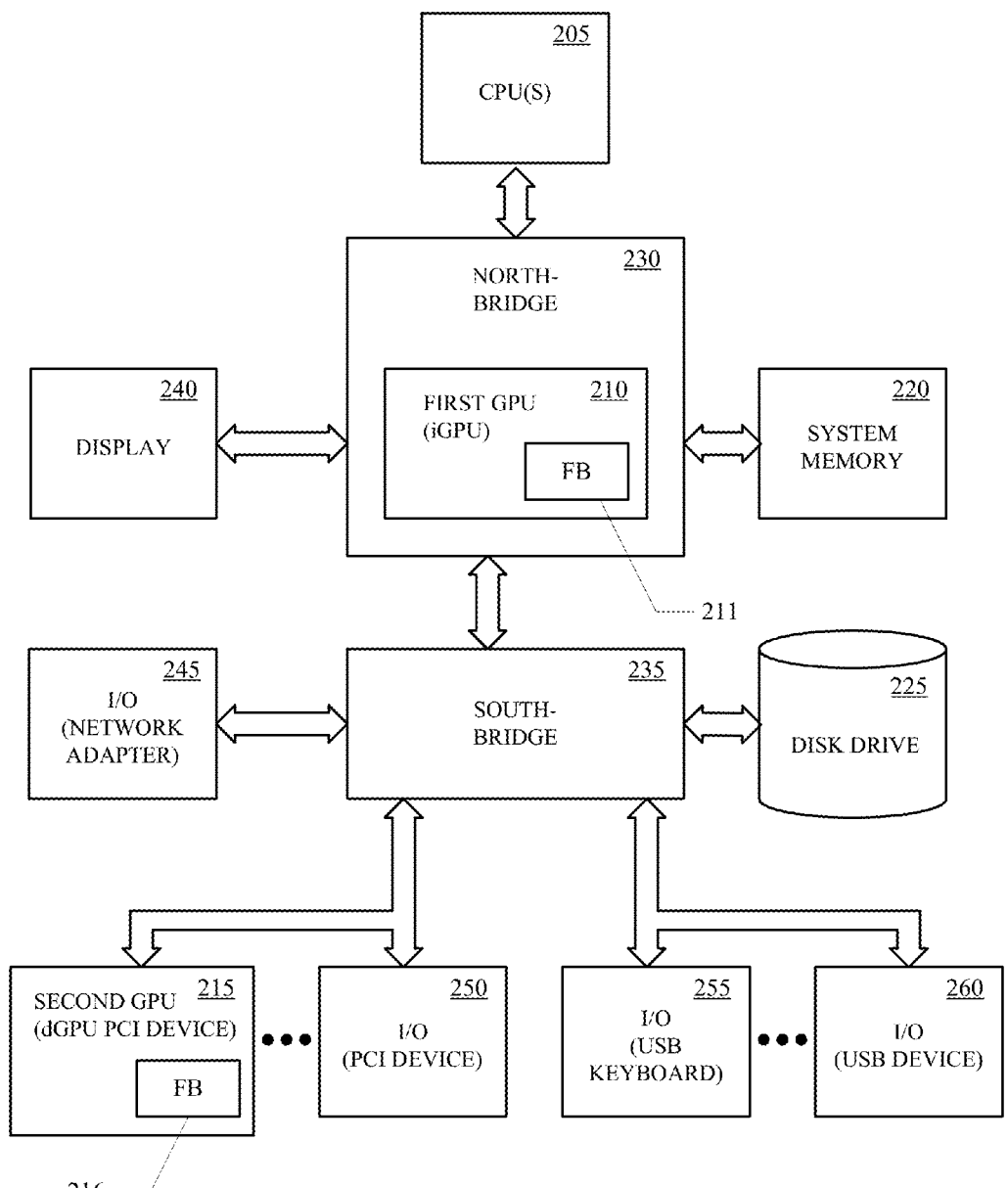
FIG. 2 shows a graphics co-processing computing platform, in accordance with one embodiment of the present technology.

Referring to FIG. 2, a graphics co-processing computing platform, in accordance with one embodiment of the present technology is shown. The exemplary computing platform may include one or more central processing units (CPUs) 205, a plurality of graphics processing units (GPUs) 210, 215, volatile and/or non-volatile memory (e.g., computer readable media) 220, 225, one or more chip sets 230, 235, and one or more peripheral devices 215, 240-260 communicatively coupled by one or more busses. The GPUs include heterogeneous designs. In one implementation, a first GPU may be an integral graphics processing unit (iGPU) and a second GPU may be a discrete graphics processing unit (dGPU). The chipset 230, 235 acts as a simple input/output hub for communicating data and instructions between the CPU 205, the GPUs 210, 215, the computing device-readable media 220, 225, and peripheral devices 215, 240-265. In one implementation, the chipset includes a northbridge 230 and southbridge 235. The northbridge 230 provides for communication between the CPU 205, system memory 220 and the southbridge 235. In one implementation, the northbridge 230 includes an integral GPU. The southbridge 235 provides for input/output functions. The peripheral devices 215, 240-265 may include a display device 240, a network adapter (e.g., Ethernet card) 245, CD drive, DVD drive, a keyboard, a pointing device, a speaker, a printer, and/or the like. In one implementation, the second graphics processing unit is coupled as a discrete GPU peripheral device 215 by a bus such as a Peripheral Component Interconnect Express (PCIe) bus.

The computing device-readable media 220, 225 may be characterized as primary memory and secondary memory. Generally, the secondary memory, such as a magnetic and/or optical storage, provides for non-volatile storage of computer-readable instructions and data for use by the computing device. For instance, the disk drive 225 may store the operating system (OS), applications and data. The primary memory, such as the system memory 220 and/or graphics memory, provides for volatile storage of computer-readable instructions and data for use by the computing device. For instance, the system memory 220 may temporarily store a portion of the operating system, a portion of one or more applications and associated data that are currently used by the CPU 205, GPU 210 and the like. In addition, the GPUs 210, 215 may include integral or discrete frame buffers 211, 216.

Figure 3:
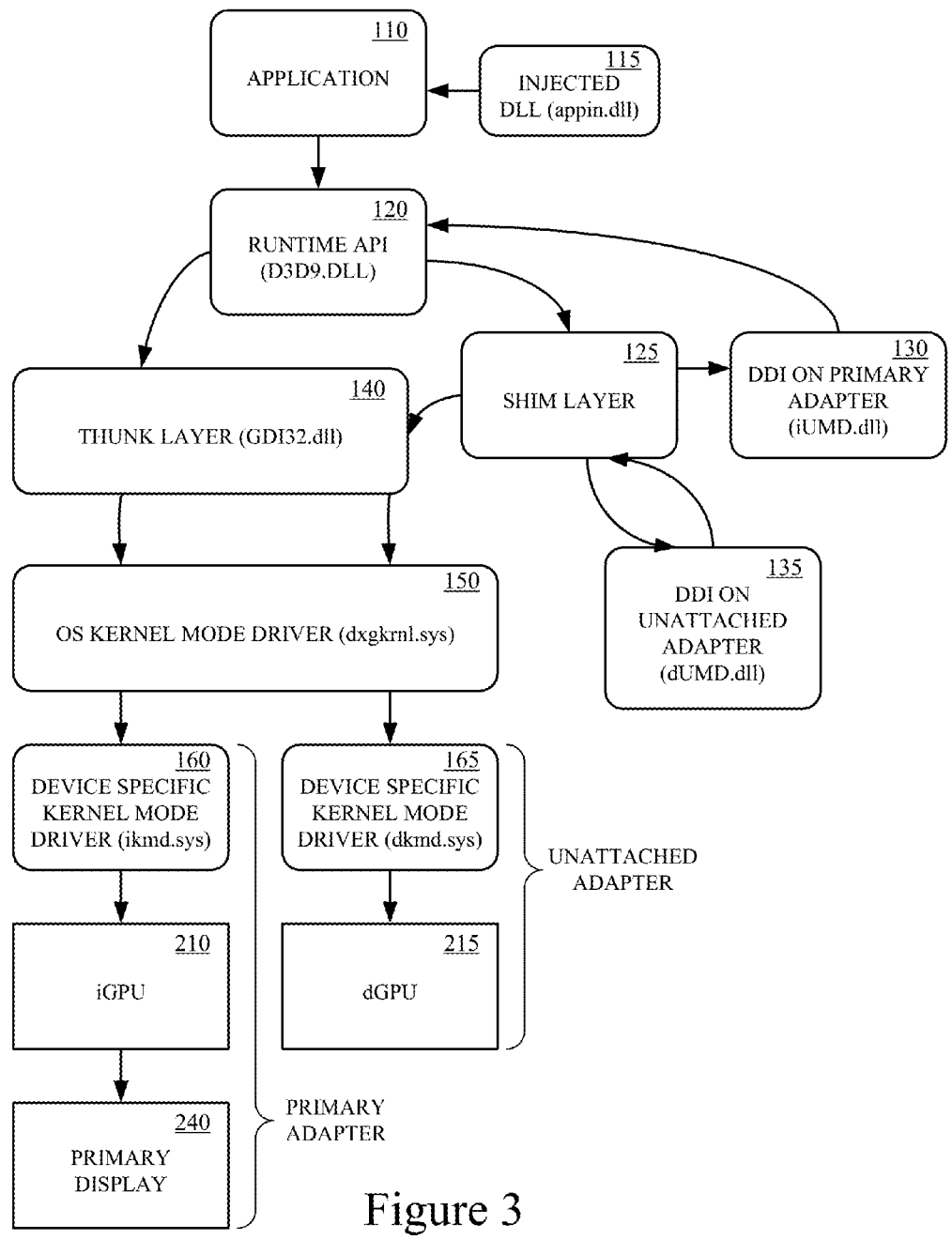
FIG. 3 shows a graphics co-processing technique, in accordance with one embodiment of the present technology.

Referring to FIG. 3, a graphics co-processing technique, in accordance with one embodiment of the present technology, is shown. When an application 110 starts, it calls the user mode level runtime application programming interface (e.g., DirectX API d3d9.dll) 120 to determine what display adapters are available. In addition, an application initialization routine is injected when the application starts. In one implementation, the application initialization routine is a short dynamic link library (e.g., appin.dll). The application initialization routine injected in the application includes some entry points, one of which includes a call (e.g., set_dll_searchpath( )) to change the search path for the display device driver interface. During initialization, the search path for the device driver interface (e.g., c:\windows\system32\ ... \umd.dll) is changed to the search path of a shim layer library (e.g., c:\ ... \coproc\ ... \umd.dll). Therefore the runtime API 120 will search for the same DDI name but in a different path, which will result in the runtime API 120 loading the shim layer 125.

The shim layer library 125 has the same entry points as a conventional display driver interface (DDI). The runtime API 120 passes one or more function pointers to the shim layer 125 when calling into the applicable entry point (e.g., OpenAdapter( )) in the shim layer 125. The function pointers passed to the shim layer 125 are call backs into the runtime API 120. The shim layer 125 stores the function pointers. The shim layer 125 loads and initializes the DDI on the primary adapter 130. The DDI on the primary adapter 130 returns a data structure pointer to the shim layer 125 representing the attached adapter. The shim layer 125 also loads and initializes the device driver interface on the unattached adapter 135 by passing two function pointers which are call backs into local functions of the shim layer 125. The DDI on the unattached adapter 135 also returns a data structure pointer to the shim layer 125 representing the unattached adapter. The data structure pointers returned by the DDI on the primary adapter 130 and unattached adapter 135 are stored by the shim layer 125. The shim layer 125 returns to the runtime API 120 a pointer to a composite data structure that contains the two handles. Accordingly, the DDI on the unattached adapter 135 is able to initialize without talking back to the runtime API 120.

In one implementation, the shim layer 125 is an independent library. The independent shim layer may be utilized when the primary GPU/display and the secondary GPU are provided by different vendors. In another implementation, the shim layer 125 may be integral to the display device interface on the unattached adapter. The shim layer integral to the display device driver may be utilized when the primary GPU/display and secondary GPU are from the same vendor.

The application initialization routine (e.g., appin.dll) injected in the application also includes other entry points, one of which includes an application identifier. In one implementation, the application identifier may be the name of the application. The shim layer 125 application makes a call to the injected application initialization routine (e.g., appin.dll) to determine the application identifier when a graphics command is received. The application identifier is compared with the applications in a white list (e.g., a text file). The white list indicates an affinity between one or more applications and the second graphics processing unit. In one implementation, the white list includes one or more applications that would perform better if executed on the second graphics processing unit.

If the application identifier is not on the white list, the shim layer 125 calls the device driver interface on the primary adapter 130. The device driver interface on the primary adapter 130 sets the command buffers. The device driver interface on the primary adapter then calls, through the runtime 120 and a thunk layer 140, to the operating system kernel mode driver (e.g., DirectX driver dxgkrnl.sys) 150. The operating system kernel mode driver 160 in turn schedules the graphics command with the device specific kernel mode driver (e.g., kmd.sys) 160 for the GPU 210 attached to the primary display 240. The GPU 210 attached to the primary display 240 is also referred to hereinafter as the first GPU. The device specific kernel mode driver 160 sets command register of the GPU 210 to execute the graphics command on the GPU 210 (e.g., integral GPU) attached to the primary display 240.

If the application identifier is a match to one or more identifiers on the white list, the handle from the runtime API 120 is swapped by the shim layer 125 with functions local to the shim layer 125. For a rendering command, the local function stored in the shim layer 125 will call into the DDI on the unattached adapter 135 to set command buffer. In response, the DDI on the unattached adapter 135 will call local functions in the shim layer 125 that route the call through the thunk layer 140 to the operating system kernel mode driver 150 to schedule the rendering command. The operating system kernel mode driver 150 calls the device specific kernel mode driver (e.g., dkmd.sys) 165 for the GPU on the unattached adapter 215 to set the command registers. The GPU on the unattached adapter 215 (e.g., discrete GPU) is also referred to hereinafter as the second GPU. Alternatively, the DDI on the unattached adapter 135 can call local functions in the thunk layer 140. The thunk layer 140 routes the graphics request to the operating system kernel mode driver (e.g., DirectX driver dxgkrnl.sys) 150. The operating system kernel mode driver 150 schedules the graphics command with the device specific kernel mode driver (e.g., dkmd.sys) 165 on the unattached adapter. The device specific kernel mode driver 165 controls the GPU on the unattached adapter 215.

For a display related command (e.g., Present( )), the shim layer 125 splits the display related command received from the application 110 into a set of commands for execution by the GPU on the unattached adapter 215 and another set of commands for execution by the GPU on the primary adapter 210. In one implementation, when the shim layer 125 receives a present call from the runtime 120, the shim layer 125 calls to the DDI on the unattached adapter 135 to cause a copy the frame buffer 216 of the GPU on the unattached adapter 215 to a corresponding buffer in system memory 220. The shim layer 125 will also call the DDI on the primary adapter 130 to cause a copy from the corresponding buffer in system memory 220 to the frame buffer 211 of the GPU on the attached adapter 210 and then a present by the GPU on the attached adapter 210. The memory accesses between the frame buffers 211, 216 and system memory 220 may be direct memory accesses (DMA). To synchronize the copy and presents on the GPUs 210, 215, a display thread is created, that is notified when the copy to system memory by the second GPU 215 is done. The display thread will then queue the copy from system memory 220 and the present call into the GPU on the attached adapter 210.

Figure 4:
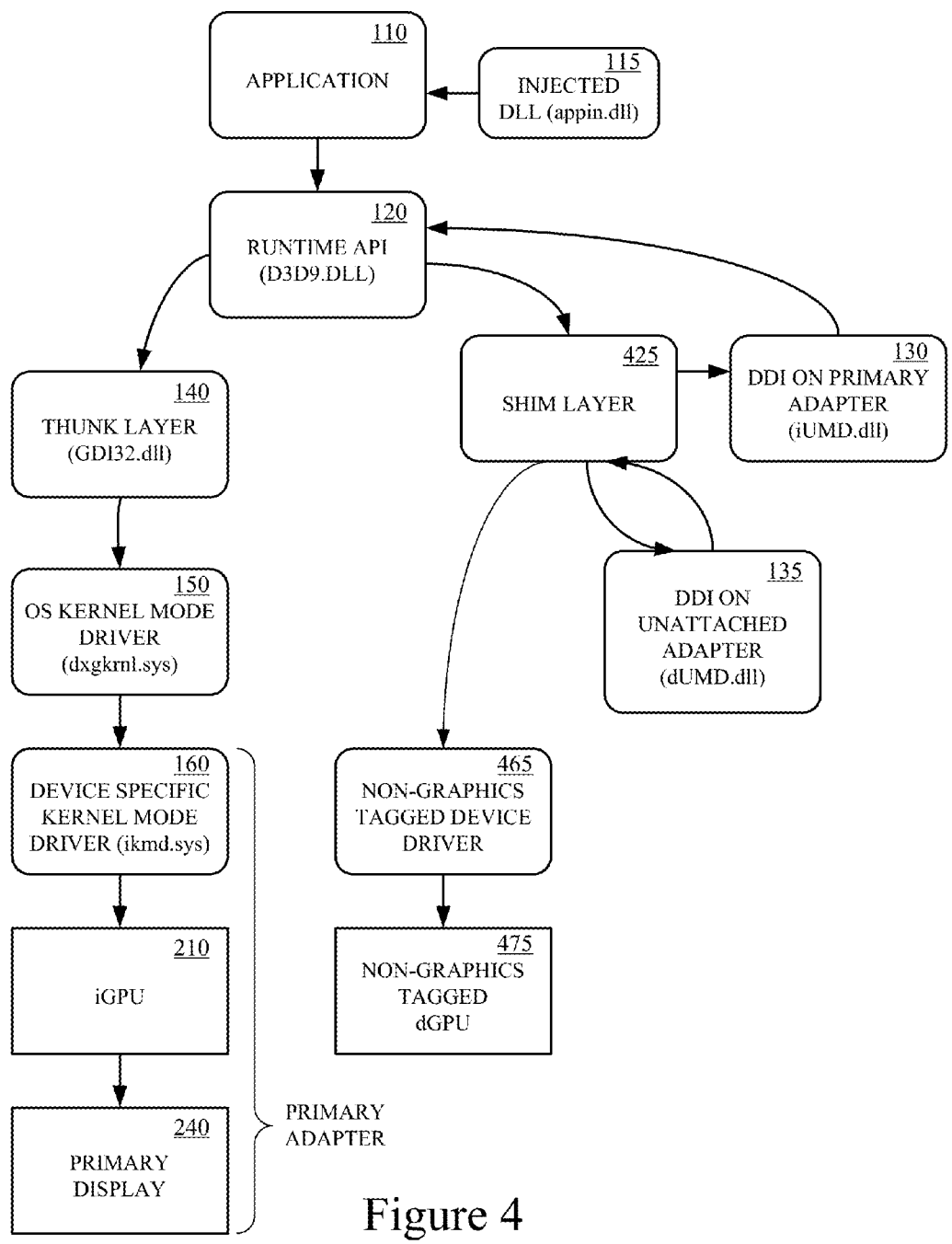
FIG. 4 shows a graphics co-processing technique, in accordance with another embodiment of the present technology.

In another implementation, the operating system (e.g., Window7Starter) will not load a second graphics driver 165. Referring now to FIG. 4, a graphics co-processing technique, in accordance with another embodiment of the present technology, is shown. When the operation system will not load a second graphics driver, the second GPU 475 is tagged as a non-graphics device adapter that has its own driver 465. Therefore the second GPU 475 and its device specific kernel mode driver 465 are not seen by the operating system as a graphics adapter. In one implementation, the second GPU 475 and its driver 465 are tagged as a memory controller. The shim layer 125 loads and configures the DDI 130 for the first GPU 210 on the primary adapter and the DDI 135 for the second GPU 475 If there is a specified affinity for executing rendering commands from the application 110 on the second GPU 475, the shim layer 125 intercepts the rendering commands sent by the runtime API 120 to the DDI on the primary adapter 130, calls the DDI on the unattached adapter to sets the commands buffers for the second GPU 475, and routes them to the driver 465 for the second GPU 475. The shim layer 125 also intercepts the callbacks from the driver 465 for the second GPU 475 to the runtime 120. In another implementation, the shim layer 125 implements the DDI 135 for the second GPU 475. Accordingly, the shim layer 125 splits graphics command and redirects them to the two DDIs 130, 135.

Accordingly, the embodiments described with reference to FIG. 3, enables the application to run on a second GPU instead of a first GPU when the particular version of the operating system will allow the driver for the second GPU to be loaded but the runtime API will not allow a second device driver interface to be initialized. The embodiments described with reference to FIG. 4 enables an application to run on a second GPU, such as a discrete GPU, instead of a first GPU, such as an integrated GPU, when the particular version of the operation system (e.g., Win7Starter) will not allow the driver for the second GPU to be loaded. The DDI 135 for the second GPU 475 cannot talkback through the runtime 120 or the thunk layer 140 to a graphics adapter handled by an OS specific kernel mode driver.

Figure 5:
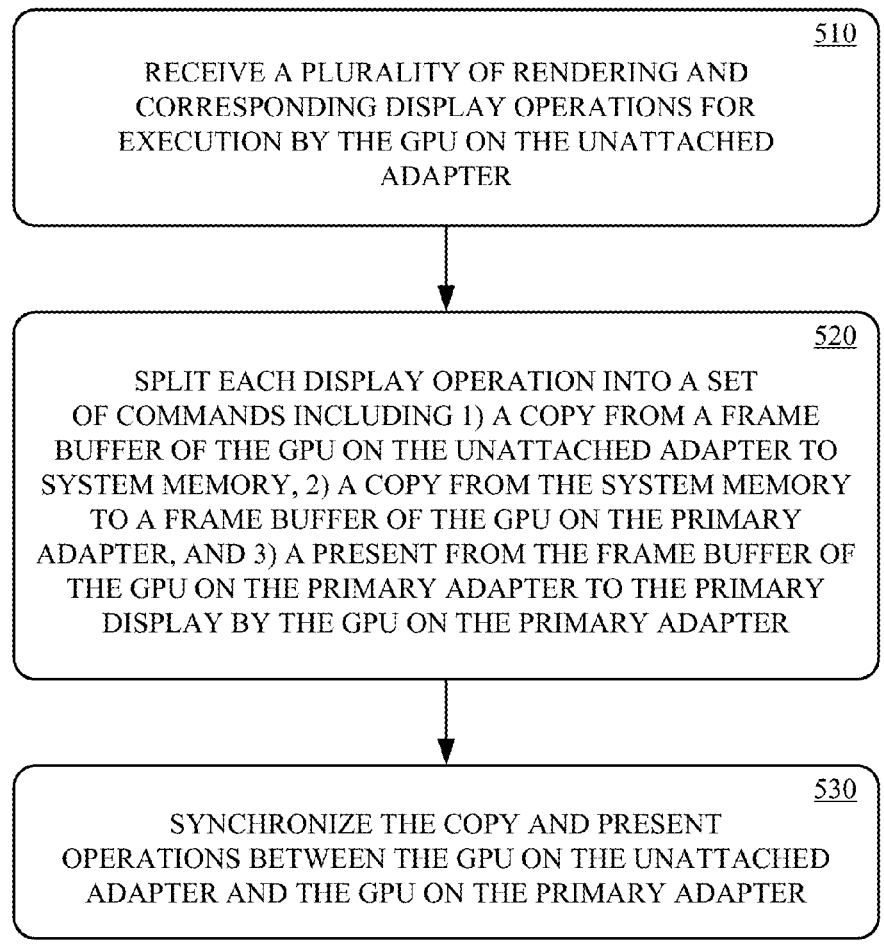
FIG. 5 shows a method of synchronizing copy and present operations on a first and second GPU, in accordance with one embodiment of the present technology.
Figure 6:
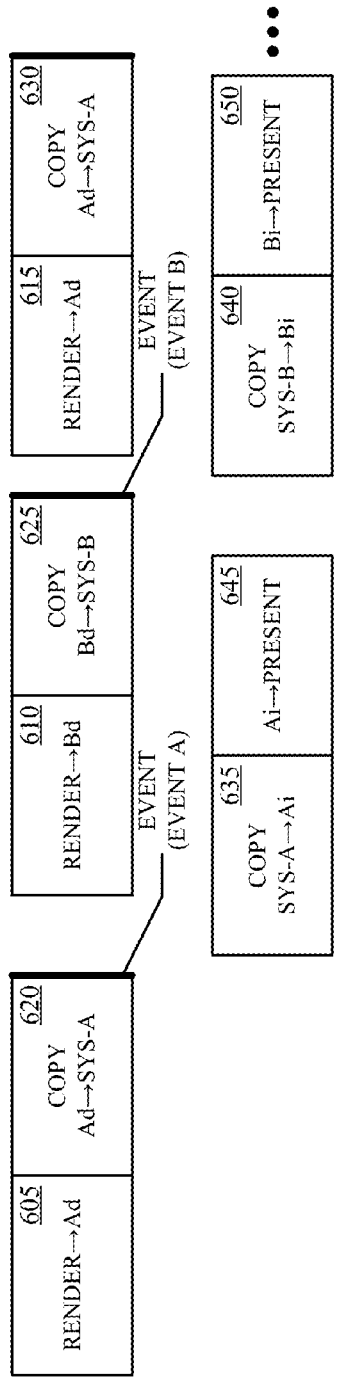
FIG. 6 shows an exemplary set of render and display operations, in accordance with one embodiment of the present technology.

Referring now to FIG. 5, a method of synchronizing the copy and present operations on the first and second GPUs is shown. The method is illustrated in FIG. 6 with reference to an exemplary set of render and display operations, in accordance with one embodiment of the present technology. At 510, the shim layer 125 receives a plurality of rendering 605-615 and display operations for execution by the GPU on the unattached adapter 215. At 520, the shim layer 125 splits each display operation into a set of commands including 1) a copy 620-630 from a frame buffer 216 of the GPU on the unattached adapter 215 to a corresponding buffer in system memory 220 having shared access with the GPU on the attached adapter 210, 2) a copy 635, 640 from the buffer in shared system memory 220 to a frame buffer of the GPU on the primary adapter 210, and 3) a present 645, 650 on the primary display 240 by the GPU on the primary adapter 210. At 530, the copy and present operations on the first and second GPUs 210, 215 are synchronized.

The frame buffers 211, 216 and shared system memory 220 may be double or ring buffered. In a double buffered implementation, the current rendering operations is stored in a given one of the double buffers 605 and the other one of the double buffers is blitted to a corresponding given one of the double buffers of the system memory. When the rendering operation is complete, the next rendering operation is stored in the other one of the double buffers and the content of the given one of the double buffers is blitted 620 to the corresponding other one of the double buffers of the system memory. The rendering and blitting alternate back and forth between the buffers of the frame buffer of the second GPU 215. The blit to system memory is executed asynchronously. In another implementation, the frame buffer of the second GPU 215 is double buffered and the corresponding buffer in system memory 220 is a three buffer ring buffer.

After the corresponding one of the double buffers of the frame buffer 216 in the second GPU 215 is blitted 620 to the system memory 220, the second GPU 210 generates an interrupt to the OS. In one implementation, the OS is programmed to signal an event to the shim layer 125 in response to the interrupt and the shim layer 125 is programmed to wait on the event before sending a copy command 635 and a present command 645 to the first GPU 210. In a thread separate from the application thread, referred to hereinafter as the display thread, the shim layer waits for receipt of the event indicating that the copy from the frame buffer to system memory is done, referred to herein after as the copy event interrupt. A separate thread is used so that the rendering commands on the first and second GPUs 210, 215 are not stalled in the application thread while waiting for the copy event interrupt. The display thread may also have a higher priority than the application thread.

A race condition may occur where the next rendering to a given one of the double buffers for the second GPU 215 begins before the previous copy from the given buffer is complete. In such case, a plurality of copy event interrupts may be utilized. In one implementation, a ring buffer and four events are utilized.

Upon receipt of the copy event interrupt, the display thread queues the blit from system memory 220 and the present call into the first GPU 210. The first GPU 210 blits the given one of the system memory 220 buffers to a corresponding given one of the frame buffers of the first GPU 210. When the blit operation is complete, the content of the given one of the frame buffers of the first GPU 210 is presented on the primary display 240. When the next copy and present commands are received by the first GPU 210, the corresponding other of the system memory 220 buffers is blitted into the other one of the frame buffer of the first GPU 210 and then the content is presented on the primary display 240. The blit and present alternate back and forth between the double buffered frame buffer of the first GPU 210. The copy event interrupt is used to delay programming, thereby effectively delaying the scheduling of the copy from system memory 220 to the frame buffer of the first GPU 210 and presenting on the primary display 240.

In one implementation, a notification on the display side indicates that the frame has been present on the display 240 by the first GPU 210. The OS is programmed to signal an event when the command buffer causing the first GPU 210 to present its frame buffer on the display is done executing. The notification maintains synchronization where an application runs with vertical blank (vblank) synchronization.

Figure 7:
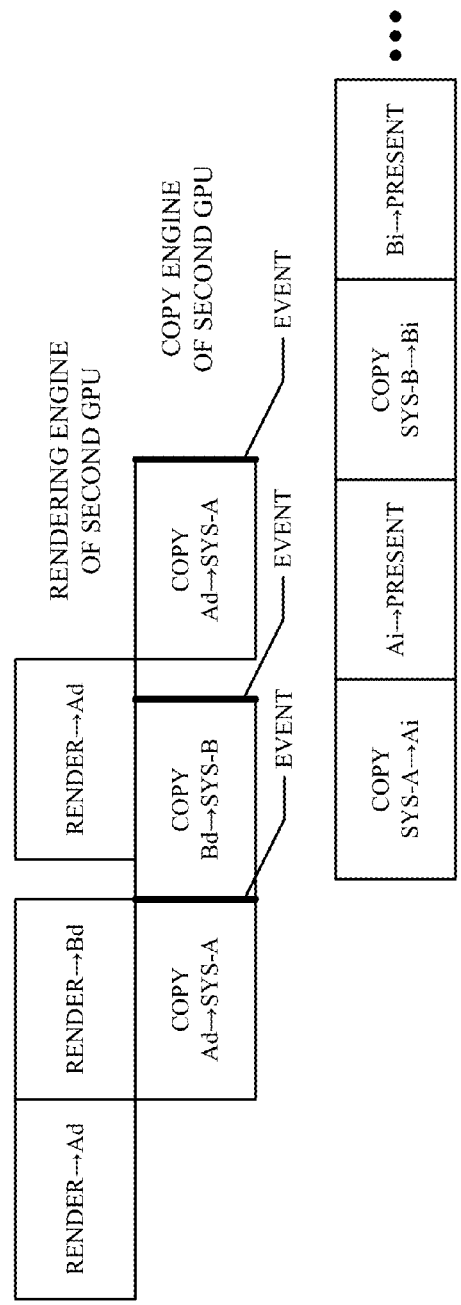
FIG. 7 shows an exemplary set of render and display operations, in accordance with another embodiment of the present technology.

Referring now to FIG. 7, an exemplary set of render and display operations, in accordance with another embodiment of the present technology, is shown. The rendering and copy operations executed on the second GPU 215 may be performed by different engines. Therefore, the rendering and copy operations may be performed substantially simultaneously in the second GPU 215.

Figure 8:
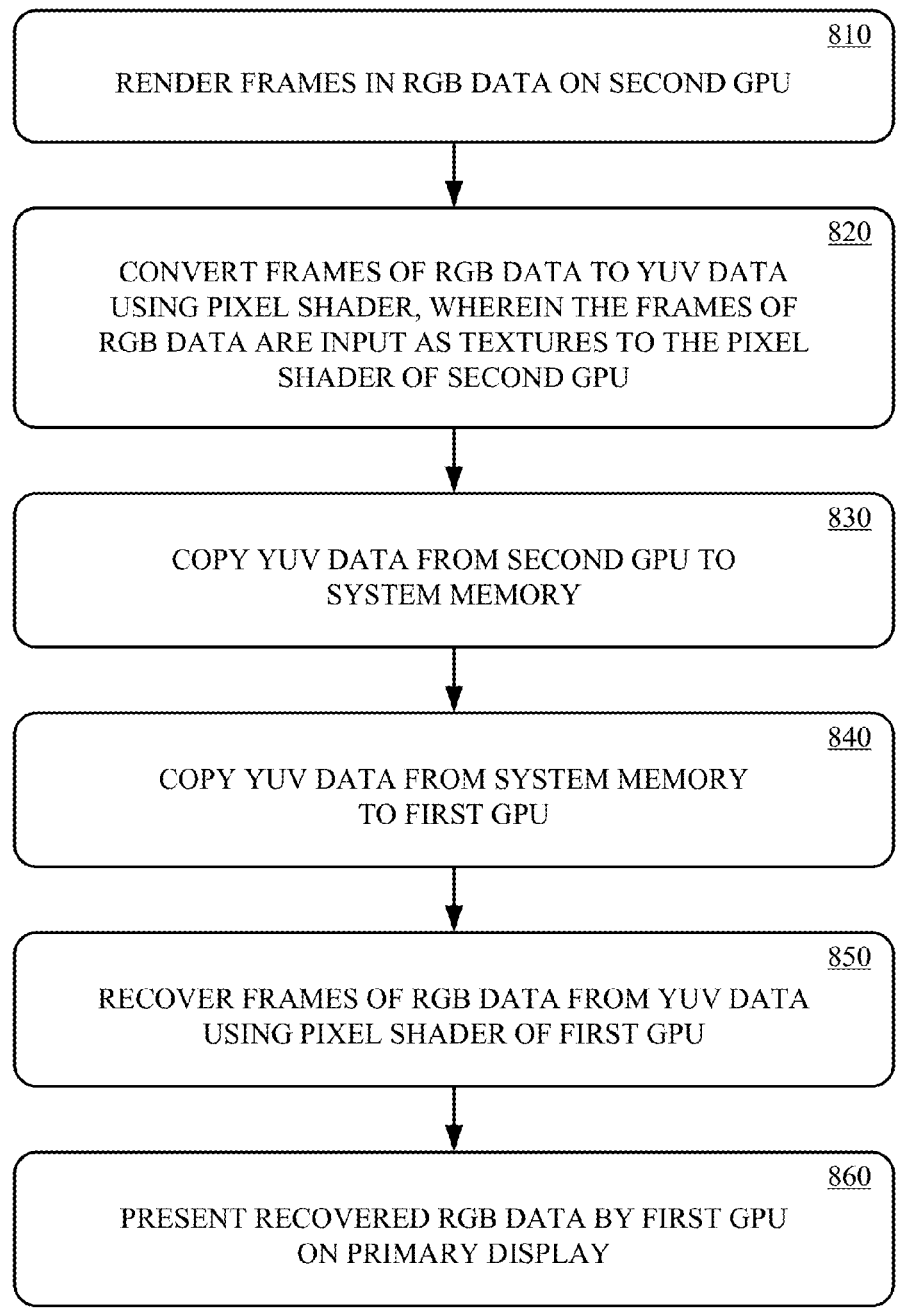
FIG. 8 shows a method of compressing rendered data, in accordance with one embodiment of the present technology.

Generally, the second GPU 215 is coupled to the system memory 220 by a bus having a relatively high bandwidth. However, in some systems the bus coupling the second GPU 215 may not provide sufficient bandwidth for blitting the frame buffer 216 of the second GPU 215 to system memory 220. For example, an application may be rendered at a resolution of 1280×1024 pixels. Therefore, approximately 5 MB/frame of RGB data is rendered. If the application renders at 100 frame/s, than the second GPU needs approximately 500 MB/s for blitting upstream to the system memory 220. However, a Peripheral Component Interconnect Express (PCIe) 1× bus typically used to couple the second GPU 215 system memory 220 has a bandwidth of approximately 250 MB/s in each direction. Referring now to FIG. 8, a method of compressing rendered data, in accordance with one embodiment of the present technology is shown. The second GPU 215 renders frames of RGB data, at 810. At 820, the frames of RGB data are converted using a pixel shader in the second GPU 215 to YUV sub-sample data. The RGB data is processed as texture data by the pixel shader in three passes to generate YUV sub-sample data. In one implementation, the U and V components are sub-sampled spatially, however, the Y is not sub-sampled. The RGB data may be converted to YUV data using the 4.2.0 color space conversion algorithm. At 830, the YUV sub-sample data is blitted to the corresponding buffers in the system memory with an asynchronous copy engine of the second GPU. The YUV sub-sample data is blitted from the system memory to buffers of the first GPU, at 840. The YUV data is blitted to corresponding texture buffers in the second GPU. The Y, U, and V sub-sample data are buffered in three corresponding buffers, and therefore the copy from frame buffer of the second GPU 215 to the system memory 220 and the copy from system memory 220 to the texture buffers of first GPU 210 are each implemented by sets of three copies. The YUV sub-sample data is converted using a pixel shader in the first GPU 210 to recreate the RGB frame data, at 850. The device driver interface on the attached adapter is programmed to render a full screened aligned quad from the corresponding texture buffers holding the YUV data. At 860, the recreated RGB frame data is then presented on the primary display 240 by the first GPU 210. Accordingly, the shaders are utilized to provide YUV compression and decompression.

In one implementation, each buffer of Y, U and V samples is double buffered in the frame buffer of the second GPU 215 and the system memory 220. In addition, the Y, U and V samples copied into the first GPU 210 are double buffered as textures. In another implementation, the Y, U and V sample buffers in the second GPU 215 and corresponding texture buffers in the first GPU 210 are each double buffered. The Y, U and V sample buffered in the system memory 220 may each be triple buffered.

In one implementation, the shim layer 125 tracks the bandwidth needed for blitting and the efficiency of transfers on the bus to enable the compression or not. In another implementation, the shim layer 125 enables the YUV compression or not based on the type of application. For example, the shim layer 125 may enable compression for game application but not for technical applications such as a Computer Aided Drawing (CAD) application.

In one embodiment the white list accessed by the shim layer 125 to determine if graphics requests should be executed on the first GPU 210 or the second GPU 215 is loaded and updated by the a vendor and/or system administrator. In another embodiment, a graphical user interface can be provided to allow the user to specific the use of the second GPU (e.g., discrete GPU) 215 for rendering a given application. The user may right click on the icon for the given application. In response to the user selection, a graphical user interface may be generated that allows the user to specify the second GPU for use when rendering image for the given application. In one implementation, the operating system is programmed to populate the graphical interface with a choice to run the given application on the GPU on the unattached adapter. A routine (e.g., dynamic linked library) registered to handle this context menu item will scan the shortcut link to the application, gather up the options and argument, and then call an application launcher that will spawn a process to launch the application as well as setting an environment variable that will be read by the shim layer 125. In response, the shim layer 125 will run the graphics context for the given application on the second GPU 215. Therefore, the user can override, update, or the like, the white list loaded on the computing device.

Figure 9:
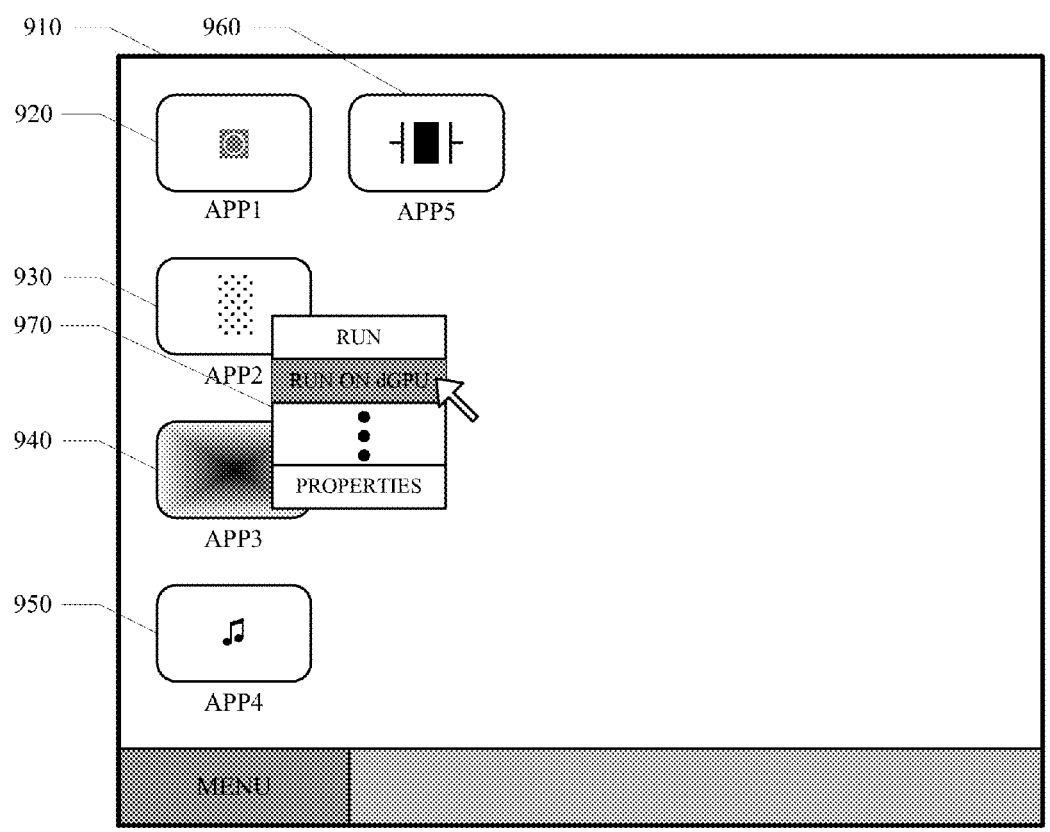
FIG. 9 shows an exemplary desktop 910 including an exemplary graphical user interface for selection of the GPU to run a given application, in accordance with one embodiment of the present technology.

Referring now to FIG. 9, an exemplary desktop 910 including an exemplary graphical user interface for selection of the GPU to run a given application on is shown. The desktop includes icons 920-950 for one or more applications. When the user right clicks on a given application, 930 a pull-down menu 970 is generated. The pull-down menu 970 is populated with an additional item of 'run on dGPU' or the like. The menu item for the second GPU 215 may provide for product branding by identifying the manufacturer and/or model of the second GPU. If the user selects the 'run' item or double left clicks on the icon, the graphics requests from the given application will run on the GPU on the primary adapter (e.g., the default iGPU) 210. If the user selects the 'run on dGPU' item, the graphics requests from the given application will run on the GPU on the unattached adapter (e.g., dGPU) 215.

Figure 10:
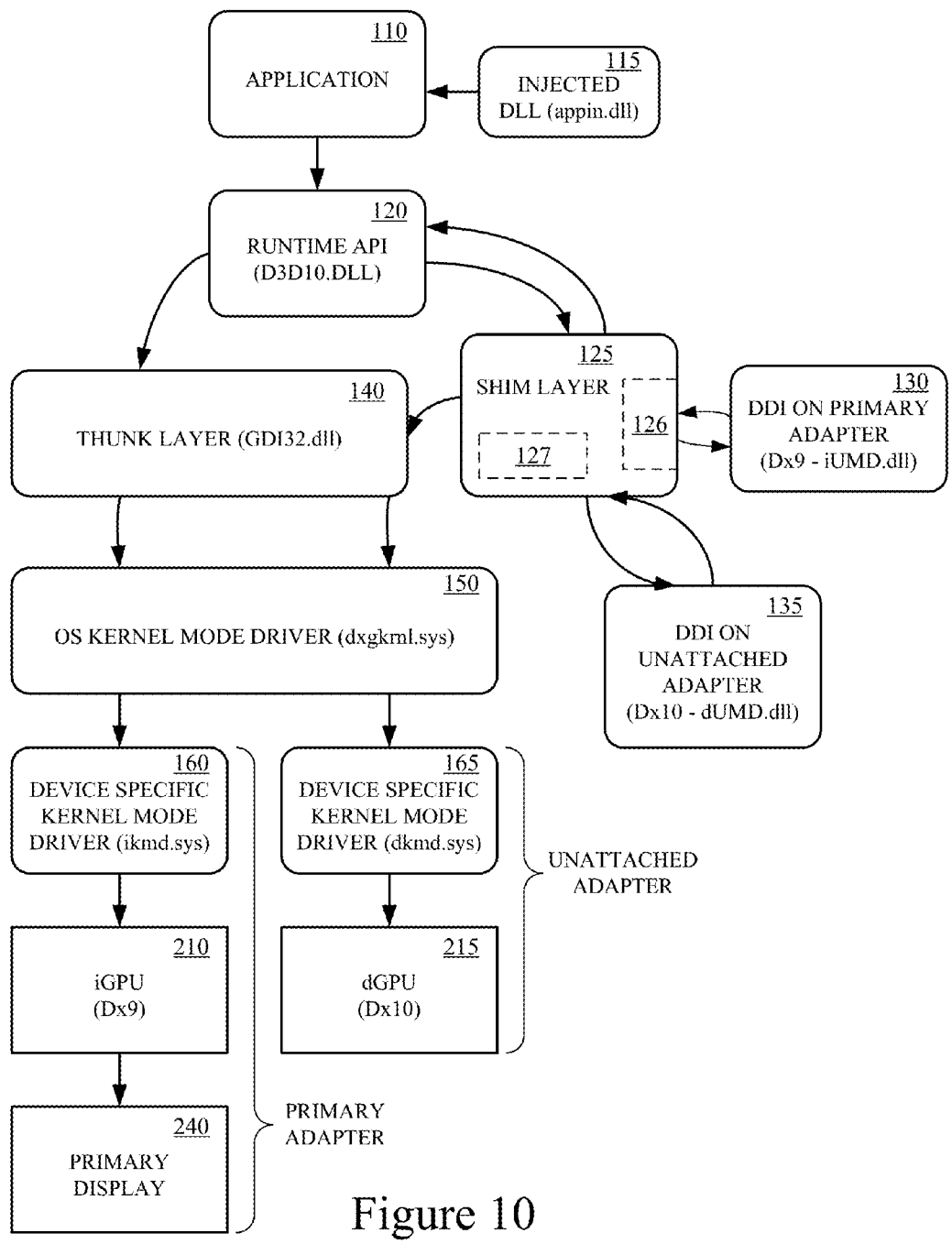
FIG. 10 shows a graphics co-processing technique, in accordance with another embodiment of the present technology.

In another implementation, the second graphics processing unit may support a set of rendering application programming interfaces and the first graphics processing unit may support a limited subset of the same application programming interfaces. An application programming interface is implemented by a different runtime API 120 and a matching driver interface 130. Referring now to FIG. 10, a graphics co-processing technique, in accordance with another embodiment of the present technology, is shown. The runtime API 120 loads a shim layer 125 that will support all device driver interfaces. The shim layer 125 loads and configures the DDI 130 for the first GPU 210 using a device driver interface that this one supports on the primary adapter and the DDI 135 for the second GPU 215 of a second device driver interface that can talk with the runtime API 120. For example, in one implementation, the second GPU 215 may be a DirectX10 class device and the first GPU 210 may be a DirectX9 class device that does not support DirectX10. The shim layer 125 appears to the DDI 130 for the first GPU 210 as a first application programming class runtime API (e.g., D3D9.dll), translates command between the two device driver interface classes and may also convert between display formats.

The shim layer 125 includes a translation layer 126 that translates calls between the runtime API 120 device driver interface and the device driver interface class. In one implementation, the shim layer 125 translates display commands between the DirectX10 runtime API 120 and the DirectX9 DDI on the primary adapter 130. The shim layer, therefore, creates a Dx9 compatible context on the first GPU 210, which is the recipient of frames rendered by the Dx10 class second GPU 215. The shim layer 125 advantageously splits graphics commands into rendering and display commands, redirects the rendering commands to the DDI on the unattached adapter 135 and the display commands to the DDI on the primary adapter 130. The shim layer also translates between the commands for the Dx9 DDI on the primary adapter 130, the Dx10 DDI on the unattached adapter 135, the Dx10 runtime API 120 and Dx10 thunk layer 140, and provides for format conversion of necessary. The shim layer 125, in one implementation, intercepts commands from the Dx10 runtime 120 and translates these into the DX9 DDI on the primary adapter (e.g., iUMD.dll). The commands may include: CreateResource, OpenResource, DestroyResource, DxgiPresent—which triggers the surface transfer mechanism that ends up with the surface displayed on the iGPU, DxgiRotateResourceIdentities, DxgiBlt—present blits are translated, and DxgiSetDisplayMode.

The Dx9 DDI 130 for the first GPU 210 cannot talkback directly through the runtime 120 to talk to a graphics adapter handled by an OS specific kernel mode driver because the runtime 120 expects the call to come from a Dx10 device. The shim layer 125 intercepts callbacks from the Dx9 DDI and exchanges device handles, before forwarding the callback to the Dx10 runtime API 120, which expects the calls to come from a Dx10 device. Dx10 and Dx11 runtime APIs 120 use a layer for presentation called DXGI, which has its own present callback, not existing in the Dx9 callback interface. Therefore, when the display side DDI on the primary adapter calls the present callback, the shim layer translates it to a DXGI callback. For example:

PFND3DDDI_PRESENTCB->PFNDDXGIDDI_PRESENTCB

The shim layer 125 may also include a data structure 127 for converting display formats between the first graphics processing unit DDI and the second graphics processing unit DDI. For example, the shim layer 125 may include a lookup table to convert a 10 bit rendering format in Dx10 to an 8 bit format supported by the Dx9 class integrated GPU 210. The rendered frame may be copied to a staging surface, a two-dimensional (2D) engine of the discrete GPU 215 utilizes the lookup table to convert the rendered frame to a Dx9 format. The Dx9 format frame is then copied to the frame buffer of the integrated GPU 210 and then presented on the primary display 240. For example, the following format conversions may be performed:
DXGI_FORMAT_R16G16B16A16_FLOAT(render)->
D3DDDIFMT_A8R8G8B8(display),
DXGI_FORMAT_R10G10B10A2_UNORM(render)->
D3DDDIFMT_A8R8G8B8(display).
In one implementation, the copying and conversion can happen as an atomic operation.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. One or more non-transitory computing device readable media having computing device executable instructions which when executed perform a method comprising:
rendering a frame of red, green, blue (RGB) data on a first graphics processing unit of a computing system on an unattached adapter of the computing system, wherein the unattached adapter is not attached to the primary display of the computing device;
converting the frame of RGB data to luminance-color difference (YUV) data on the first graphics processing unit;
copying the YUV data from frame buffers of the first graphics processing unit to buffers in system memory of the computing system, in response to a first copy command split by a shim layer from a display operation;
copying the YUV data from the buffers in the system memory to texture buffers of a second graphics processing unit of the computing system on a primary adapter of the computing system, wherein the primary adapter is attached to the primary display, in response to a second copy command split by the shim layer from the display operation;
recovering a frame of RGB data from the YUV data in the texture buffers of the second graphics processing unit; and
presenting the recovered frame of RGB data, by the second graphics processing unit, on the primary display, in response to a present command split by the shim layer from the display operation.

2. The one or more non-transitory computing device readable media having computing device executable instructions which when executed perform the method of claim 1, further comprising converting the frame of RGB data to YUV data using a pixel shader of the graphics processing unit on the unattached adapter.

3. The one or more non-transitory computing device readable media having computing device executable instructions which when executed perform the method of claim 2, further comprising recovering the frame of RGB data from the YUV data using a pixel shader of the graphics processing unit on the primary adapter.

4. The one or more non-transitory computing device readable media having computing device executable instructions which when executed perform the method of claim 3, wherein the pixel shaders apply a 4.2.0 color space conversion algorithm.

5. The one or more non-transitory computing device readable media having computing device executable instructions which when executed perform the method of claim 1, wherein the graphics processing unit on the unattached adapter is coupled to the system memory by a peripheral component Interconnect Express (PCIe) 1× bus.

6. The one or more non-transitory computing device readable media having computing device executable instructions which when executed perform the method of claim 1, wherein the graphics processing unit on the primary adapter comprises an integrated graphics processing unit.

7. The one or more non-transitory computing device readable media having computing device executable instructions which when executed perform the method of claim 1, wherein the graphics processing unit on the unattached adapter comprises a discrete graphics processing unit.

8. The one or more non-transitory computing device readable media having computing device executable instructions which when executed perform the method of claim 1, the graphics processing unit on the primary adapter and the graphics processing unit on the unattached adapter are heterogeneous graphics processing units.

9. A method comprising:
loading and initializing, by a shim layer, a device driver interface and a device specific kernel mode driver for a graphics processing unit on a primary adapter of a computing system;
loading and initializing, by a shim layer, a device driver interface and a device specific kernel mode driver for a graphics processing unit on an unattached adapter of the computing system without the device driver interface talking back to a runtime application programming interface;
rendering a frame of red, green, blue (RGB) data on the graphics processing unit on the unattached adapter;
converting the frame of RGB data to luminance-color difference (YUV) data on the graphics processing unit on the unattached adapter;
copying the YUV data from frame buffers of the graphics processing unit on the unattached adapter to buffers in system memory of the computing system in response to a first copy command split by the shim layer from a display command;
copying the YUV data from the buffers in the system memory to texture buffers of the graphics processing unit on the primary adapter in response to a second copy command split by the shim layer from the display command;
recovering a frame of RGB data from the YUV data in the texture buffers of the graphics processing unit on the primary adapter; and
presenting the recovered frame of RGB data, by the graphics processing unit on the primary adapter, on the primary display, in response to a present command split by the shim layer from the display command.

10. The method according to claim 9, further comprising:
changing a search path for a display device interface to a search path of a shim layer library before loading the displayer device interface; and
loading the shim layer library, wherein the shim layer loads and initializes the device driver interface for the graphics processing unit on a primary adapter and loads and initializes the device driver interface for the graphics processing unit on an unattached adapter.

11. The method according to claim 9, further comprising:
determining an affinity between an application and the graphics processing unit on the unattached adapter;
processing graphics commands from the device driver interface on the unattached adapter to the device specific kernel mode driver of the graphics processing unit on the unattached adapter if the affinity between an application and the graphics processing unit on the unattached adapter is determined; and
processing graphics commands from the device driver interface on the primary adapter to the device specific kernel mode driver of the graphics processing unit on the primary adapter if no affinity between an application and the graphics processing unit on the unattached adapter is determined.

12. The method according to claim 11, wherein determining the affinity between the application and the graphics processing unit on the unattached adapter comprises determining if an identifier of the application is on a white list.

13. The method according to claim 9, further comprising converting the frame of RGB data to YUV data using a pixel shader of the graphics processing unit of the unattached adapter.

14. The method according to claim 13, further comprising recovering the frame of RGB data from the YUV data using a pixel shader of the graphics processing unit on the primary adapter.

15. The method according to claim 9, wherein the graphics processing unit or the unattached adapter is coupled to the system memory by a peripheral component Interconnect Express (PCIe) 1× bus.

16. One or more non-transitory computing device readable media having computing device executable instructions which when executed perform a method comprising:
- loading, by a shim layer, a device specific kernel mode driver of a graphics processing unit tagged as a non-graphics device of a computing system;
- loading, and initializing, by a shim layer, a device driver interface and a device specific kernel mode driver for a graphics processing unit on a primary adapter of the computing system;
- loading and initializing, by a shim layer a device driver interface for the graphics processing unit on a non-graphics device tagged adapter of the computing system without the device driver interface talking back to a runtime application programming interface;
- rendering a frame of red, green, blue (RGB) data on the graphics processing unit on the non-graphics device tagged adapter;
- converting the frame of RGB data to luminance-color difference (YUV) data on the graphics processing unit on the non-graphics device tagged adapter;
- copying the YUV data from frame buffers of the graphics processing unit on the non-graphics device tagged adapter to buffers in system memory of the computing system, in response to a first copy command split by the shim layer from a display command;
- copying the YUV data from the buffers in the system memory to texture buffers of the graphics processing unit on the primary adapter, in response to a second copy command split by the shim layer from the display command;
- recovering a frame of RGB data from the YUV data in the texture buffer of the graphics processing unit on the primary adapter; and
- presenting the recovered frame of RGB data, by the graphics processing unit on the primary adapter, on the primary display, in response to a present command spit by the shim layer from the display command.

17. The one or more non-transitory computing device readable media having computing device executable instructions which when executed perform the method of claim 16, further comprising:
- changing a search path for a display device interface to a search path of a shim layer library before loading the displayer device interface; and
- loading the shim layer library, wherein the shim layer loads and initializes the device driver interface for the graphics processing unit on a primary adapter and loads and initializes the device driver interface for the graphics processing unit on the non-graphics device tagged adapter.

18. The one or more non-transitory computing device readable media having computing device executable instructions which when executed perform the method of claim 16, further comprising:
- determining an affinity between an application and the graphics processing unit the non-graphics device tagged adapter;
- processing graphics commands from the device driver interface to the device specific kernel mode driver of the graphics processing unit the non-graphics device tagged adapter if the affinity between an application and the graphics processing unit on the non-graphics device tagged adapter is determined; and
- processing, graphics commands from the device driver interface to the device specific kernel mode driver of the graphics processing unit on the primary adapter if no affinity between an application and a second graphics processing unit is determined.

19. The one or more non-transitory computing device readable media having computing device executable instructions which when executed perform the method of claim 16, further comprising converting the frame of RGB data to YUV data using a pixel shader of the graphics processing unit on the non-graphics device tagged adapter.

20. The one or more non-transitory computing device readable media having computing device executable instructions which when executed perform the method of claim 16, further comprising recovering, the frame of RGB data from the YUV data using a pixel shader of the graphics processing unit on the primary adapter.

* * * * *